June 1, 1937.                    D. W. EXNER                    2,081,991
                            REVERSE CURRENT SWITCH
                              Filed July 7, 1932
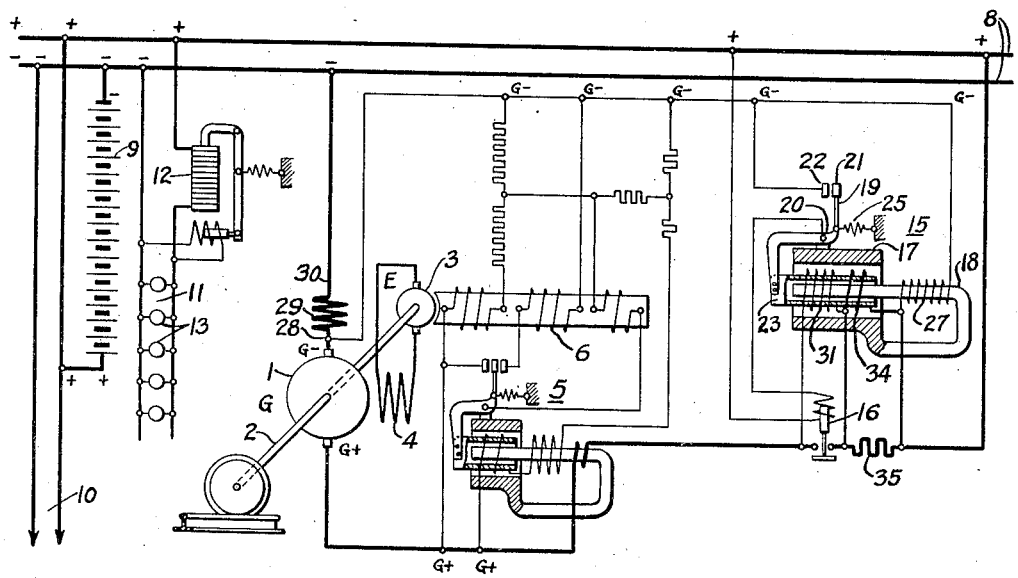
WITNESSES:                                              INVENTOR
                                                    Donald W. Exner.
                                                    BY
                                                        ATTORNEY Patented June 1, 1937

2,081,991

UNITED STATES PATENT OFFICE 2,081,991

REVERSE-CURRENT SWITCH

Donald W. Exner, Forest Hills, Pa., assignor to Westinghouse Electric & Manufacturing Company, East Pittsburgh, Pa., a corporation of Pennsylvania Application July 7, 1932, Serial No. 621,224

4 Claims. (Cl. 171—313)

My invention relates to electromagnetic control devices and it has particular relation to a device of this nature which is designed to operate as a reverse-current switch in connection with an axle driven generator on a railway car cooperating with a storage battery for supplying electric current for the car, the function of the switch being to connect the generator to the battery when the generator has a voltage sufficient to charge the battery and to disconnect the generator in time to prevent a material reverse-current flow to the generator. In manufacturing my new switch device, I prefer to utilize, to as large an extent as possible, a control device which has heretofore been well developed and widely used, both as a switch or relay which closes its contacts and holds them closed, and as a voltage regulator with vibratory contacts, as shown in a patent to Walter Schaelchlin, No. 1,820,712, granted August 25, 1931 and assigned to the Westinghouse Electric & Manufacturing Company. The only change which I have introduced is a change in the number and the operative relationship of the electrical coils or windings thereon, thereby taking advantage of the proven worth and reliability of the constant-torque characteristic, the sensitive operation, and the ability to stand up in spite of vibration of its supporting member, as in railway car service, which have been characteristic of the Schaelchlin device.

The nature of my invention will be better understood with reference to the accompanying drawing, the single figure of which shows a diagrammatic view of circuits and apparatus showing a preferred form of construction of my invention applied to an axle driven generator and storage battery system for supplying electric power to a railway car.

In the system as shown in the drawing, a direct-current generator is driven, by any suitable means, from one of the axles 2 of a railway car, the particular form of drive forming no part of my present invention and being shown in detail and claimed in a copending application of W. A. Brecht, Serial No. 648,203, filed December 21, 1932, patented September 8, 1936, No. 2,053,419, assigned to the Westinghouse Electric & Manufacturing Company.

Mounted on the shaft of the generator 1 is an exciter 3, the armature of which is permanently connected to the exciting field winding 4 of the generator 1. This exciter is especially designed to have a high remanence, in order to avoid the necessity for a reversing switch, as set forth in a copending application of C. F. Jenkins, Serial No. 621,161, filed July 7, 1932, patented December 25, 1934, No. 1,985,679, assigned to the Westinghouse Electric & Manufacturing Company.

The voltage of the axle-driven generator 1 is controlled by means of a voltage regulator 5 operating upon the field windings 6 of the exciter 3. Insofar as my present invention is concerned, any suitable voltage regulator may be utilized, preferably one which is not physically connected to my reversing switch, subsequently to be described. The particular voltage regulator shown in the drawing is described and claimed in an application of Herman C. Krapf and J. O. Sherrard, Serial No. 621,135, filed July 7, 1932, patented August 21, 1934, No. 1,971,109, assigned to the Westinghouse Electric & Manufacturing Company.

The railway car is provided with a direct-current bus 8 which is permanently connected across the terminals of a storage battery 9. The direct-current bus may have a feeder 10 extending out therefrom to supply current to a heavy-duty power device, such as an air-conditioning plant, if desired, and another feeder 11, connected to the bus through a carbon-pile voltage regulator 12, for supplying a plurality of lights 13 with a voltage which remains substantially constant notwithstanding the difference between the charging voltage and the discharging voltage of the battery 9.

It is customary, in car lighting systems utilizing axle generators and storage batteries, to provide some sort of reverse-current switch mechanism 15 to ensure that the axle driven generator is disconnected from the battery at all times except when the speed of the car, and hence the speed of the generator, is above a predetermined minimum value, so as to ensure that the generator is building up sufficient voltage to charge the battery before it is connected to the battery. In order to lessen the duty on the contact members of my reverse-current switch 15, I prefer to utilize this switch as a relay for actuating a heavy-duty electromagnetic contactor 16 which actually performs the operation of connecting and disconnecting the axle-driven generator 1 to the direct-current bus 8.

As my electromagnetic reverse-current switch or relay 15 utilizes the same structure, except for the coils and connections, as the Schaelchlin device previously referred to, a brief description of this structure will first be given. Essentially it consists of a field member comprising a soft-iron casting having a tubular portion 17 which is magnetically joined, at one end, to a core-portion 18 which extends axially through the tubular portion 17. In addition to the frame or field member just described, there is a moving element consisting of a bell-crank lever 19 which is pivoted at 20 to a lug on the cylindrical portion 17 of the frame member. One end of the bell-crank movable element carries a movable contact member 21 which cooperates with one or more stationary contact members, in this case only one, as indicated at 22. The other end of the bell-crank movable element carries an insulating tube 23 which extends through the tubular field portion 17 and around the corresponding part of the field core 18, without touching either one. The insulating tube carries the windings of the movable element, in the form of one or more coils wound around the tube. The movable bell-crank member 19 is normally biased toward one extreme position by means of a spring 25.

The objects of the construction just described are, first, to provide a structure in which vibration of the structure as a whole will not tend to open or close the contact members 21 and 22, and second, to provide a structure in which the electromagnetic pull between the stationary or field member and the movable member shall not be affected by the position of the movable member, thereby securing very great sensitiveness. This latter object is accomplished also by causing the field member to produce a uniform field across the air gap in which the rotor coils are disposed, somewhat similar to an electric motor, except that the rotor coils of this switch device are disposed in a plane perpendicular to the axis instead of in an axial plane, as in an electric motor, with the result that a movement is produced in an axial direction instead of in a circumferential direction as in a motor.

According to my invention, I provide the field member 18 with a single exciting coil 27, the same being energized, in this case, across the terminals of the direct-current bus 8, or, as shown in the drawing, as a matter of convenience in making the connections, the field coil 27 may be connected between the positive bus and the inner terminal 28 of the commutating winding 29 of the axle-driven generator 1, the outer terminal 30 of this commutating winding being connected to the negative bus.

The distinctive feature about my invention is that I utilize two coils on the insulating tubular member 23 of the movable element. The first coil is a shunt winding 31 of many turns, which, when the axle-driven generator is disconnected from the bus, responds to the difference between the bus voltage and the generator voltage, so that a very small current is normally flowing all the time, when the generator is not working, in a reverse direction from the direct-current bus 8 into the generator 1, through the shunt coil 31 on the movable element of my reverse-current switch. This reverse current in the movable coil cooperates with the air gap field of the stationary coil 27 to produce a torque in a direction tending to assist the spring 25 in opening the contacts 21 and 22 and holding the same open. As soon as the speed of the generator increases to a point at which its voltage is higher than that of the bus 8, the current in the shunt coil 31 changes in direction, as the generator sends current into the bus, and thus a very small current-flow is produced in the shunt winding 31, which produces a torque in the opposite direction, which quickly overcomes the pull of the spring 25 and closes the contacts 21 and 22.

My second coil on the movable element now comes into play. This coil is a series coil 34 consisting of only a few turns of heavy wire, the same being connected either in series with one of the generator terminals, or connected, as shown, across a shunt 35 consisting of a resistor element of very low resistance, so as not to consume any appreciable amount of power.

As long as the only connection between the generator and the bus is through the high-resistance shunt coil 31, the current through the series coil 34 is too small to make any material difference in the operation of the device. As soon as the relay contacts 21 and 22 are closed, however, the electromagnetic contactor 16 picks up, to short-circuit the shunt coil 31 and connect the generator 1 directly across the bus 8. A charging current of material amount thereupon flows from the generator to the bus, and this current, or the portion of it which passes through the series coil 34, energizes the latter in a direction necessary to maintain the electromagnetic force tending to keep the relay contacts 21 and 22 closed against the pull of the spring 25. The reverse-current switch 15 thus keeps its contacts 21 and 22 firmly closed, from the first moment of closure, and throughout the subsequent operation of the generator, until the speed of the generator drops to a value which is lower than the speed at which the contacts 21 and 22 first close. At this point, the current through the series coil 34 becomes too small to hold the switch contacts 21 and 22 closed against the pull of the spring 25 tending to open them, and the heavy-duty electromagnetic contactor 16 is thereupon opened to disconnect the generator 1 from the bus 8 before the bus begins to send current in the reverse direction through the generator armature. The electromagnetic pull immediately set up by the shunt coil 31 is now smaller than the amount necessary to close the switch contacts 21 and 22, so that the switch contacts remain open without vibrating, until the speed of the generator again increases as first described.

By my provision of two coils 31 and 34 on the rotor element I have made a very satisfactory reverse-current switch out of the physical structure (except for the coils and connections) which Schaelchlin utilized as a vibratory voltage-regulator as described in his aforementioned Patent No. 1,820,712. It will be noted that I have accomplished this result without producing any material current-drain on the battery 9 during the times when the generator 1 is not operating, and without interposing any large impedance in series with the generator when it is charging the battery 9 or, in general, supplying current to the direct-current bus 8, as would have been the case if I had not utilized two coils on the movable element, one coil being a shunt coil of high resistance and the other being a series coil of low resistance.

While I have described my invention in a single preferred form of embodiment and for a particular use, it will be obvious that I am not limited to that embodiment or that use. I desire, therefore, that the appended claims shall be given the broadest construction consistent with their language and the prior art.

I claim as my invention:

1. Relaying means including terminals for two sources, switch contact means operable to closed position for interconnecting the terminals of the two sources, said switch contact means being so constructed and arranged that it is normally biased to open position, a series relay-coil in series relation in said interconnection, and a shunt relay-coil shunting said switch contact means, the design and arrangement of said relaying means being such as to develop actuating forces in response to the resultant energizations of the respective coils, the connections and operative arrangements being such that the series relay-coil is energized substantially proportionately to the current through said switch contact means whenever the latter is closed, whereas the shunt relay-coil is energized substantially proportionately to the voltage across said switch contact means whenever the latter is open, the relative magnitude of the switch-contact biasing-force as compared to the ampere-turns and magnetic forces developed by the series and shunt relay-coils being such that said shunt relay-coil operates to cause the switch contact means to close against the biasing force thereof in response only to a predetermined material magnitude and a predetermined direction of said voltage, so that a current which is at least of a predetermined material magnitude will flow between said sources immediately upon the closure of said switch contact means, said series relay-coil being sufficiently strong to keep the switch contact means closed, against the biasing-force thereof, when said shunt relay-coil is shunted by said switch contact means, until the current in said series relay-coil falls to a value which is materially greater than zero and materially lower than its initial value which it had when the switch contact means first closed, the biasing force of said relaying means thereupon overpowering the actuating force developed by said series relay-coil so as to initiate the opening of the switch contact means, whereby said shunt relay-coil will not immediately again close the switch contact means when the series relay-coil has ceased to hold it in its closed position.

2. Relaying means including terminals for two sources, shunt and series coils connected between the two source-terminals, so as to be energized by the two sources at all times substantially proportionately to the voltage and current, respectively, between the two sources, and switch contact means in shunt relation to the shunt coil and in series relation to the series coil, the design and arrangement of said relaying means being such as to develop actuating forces in response to the resultant energizations of the respective coils, said switch contact means being so constructed and arranged that it is normally biased to non-actuated position, the relative magnitude of the switch-contact biasing-force as compared to the ampere-turns and magnetic forces developed by the series and shunt coils being such that said shunt coil operates to cause the switch contact means to move to actuated position, against the biasing force thereof, in response only to a predetermined material magnitude and a predetermined direction of said voltage, so that a current which is at least of a predetermined material magnitude will flow between said sources immediately upon the actuation of said switch contact means, said series coil being sufficiently strong to keep the switch contact means actuated, against the biasing force thereof, when said shunt coil is shunted by said switch contact means, until the current in said series coil falls to a value which is materially greater than zero and materially lower than its initial value which it had when the switch contact means first moved to actuated position, the biasing force of said relaying means thereupon overpowering the actuating force developed by said series coil so as to initiate the movement of the switch contact means to nonactuated position, whereby said shunt coil will not immediately again actuate the switch contact means when the series coil has ceased to hold it in its actuated position.

3. Relaying means including terminals for two sources, switch contact means operable to closed position for interconnecting the terminals of the two sources, said switch contact means being so constructed and arranged that it is normally biased to open position, a series relay-coil in series relation in said interconnection, and a shunt relay-coil shunting said switch contact means, the design and arrangement of said relaying means being such as to develop actuating forces which are substantially independent of the position of the switch contact means, in response to the resultant energizations of the respective coils, the connections and operative arrangements being such that the series relay-coil is energized substantially proportionately to the current through said switch contact means whenever the latter is closed, whereas the shunt relay-coil is energized substantially proportionately to the voltage across said switch contact means whenever the latter is open, the relative magnitude of the switch-contact biasing-force as compared to the ampere-turns and magnetic forces developed by the series and shunt relay-coils being such that said shunt relay-coil operates to cause the switch contact means to close against the biasing force thereof in response only to a predetermined material magnitude and a predetermined direction of said voltage, so that a current which is at least of a predetermined material magnitude will flow between said sources immediately upon the closure of said switch contact means, said series relay-coil being sufficiently strong to keep the switch contact means closed, against the biasing-force thereof, when said shunt relay-coil is shunted by said switch contact means, until the current in said series relay-coil falls to a value which is materially greater than zero and materially lower than its initial value which it had when the switch contact means first closed, the biasing force of said relaying means thereupon overpowering the actuating force developed by said series relay-coil so as to initiate the opening of the switch contact means, whereby said shunt relay-coil will not immediately again close the switch contact means when the series relay-coil has ceased to hold it in its closed position.

4. Relaying means including terminals for two sources, shunt and series coils connected between the two source-terminals, so as to be energized by the two sources at all times substantially proportionately to the voltage and current, respectively, between the two sources, and switch contact means in shunt relation to the shunt coil and in series relation to the series coil, the design and arrangement of said relaying means being such as to develop actuating forces which are substantially independent of the position of the switch contact means, in response to the resultant energizations of the respective coils, said switch contact means being so constructed and arranged that it is normally biased to non-actuated position, the relative magnitude of the switch-contact biasing-force as compared to the ampere-turns and magnetic forces developed by the series and shunt coils being such that said shunt coil operates to cause the switch contact means to move to actuated position, against the biasing force thereof, in response only to a predetermined material magnitude and a predetermined direction of said voltage, so that a current which is at least of a predetermined material magnitude will flow between said sources immediately upon the actuation of said switch contact means, said series coil being sufficiently strong to keep the switch contact means actuated, against the biasing force thereof, when said shunt coil is shunted by said switch contact means, until the current in said series coil falls to a value which is materially greater than zero and materially lower than its initial value which it had when the switch contact means first moved to actuated position, the biasing force of said relaying means thereupon overpowering the actuating force developed by said series coil so as to initiate the movement of the switch contact means to non-actuated position, whereby said shunt coil will not immediately again actuate the switch contact means when the series coil has ceased to hold it in its actuated position.

DONALD W. EXNER.